United States Patent [19]
Belart et al.

[11] Patent Number: 4,523,792
[45] Date of Patent: Jun. 18, 1985

[54] DUAL-CIRCUIT HYDRAULIC BRAKE SYSTEM

[75] Inventors: Juan Belart, Walldorf; Jochen Burgdorf, Offenbach-Rumpenheim, both of Fed. Rep. of Germany

[73] Assignee: ITT Industries, Inc., New York, N.Y.

[21] Appl. No.: 560,383

[22] Filed: Dec. 12, 1983

[30] Foreign Application Priority Data

Dec. 22, 1982 [DE] Fed. Rep. of Germany ....... 3247496

[51] Int. Cl.³ .......................... B60T 8/02; B60T 17/22
[52] U.S. Cl. .................................... 303/92; 188/345; 303/100; 303/114; 303/116; 303/119
[58] Field of Search ............... 303/119, 116, 114, 117, 303/113, 92, DIG. 1, 100, 6 R, 10–12, 13–15; 188/181 A, 181 R, 345, 151 A

[56] References Cited

U.S. PATENT DOCUMENTS

| | | | |
|---|---|---|---|
| 3,827,761 | 8/1974 | Inada | 303/113 X |
| 3,948,568 | 4/1976 | Leiber | 303/92 |
| 4,340,257 | 7/1982 | Belart | 303/119 X |
| 4,354,714 | 10/1982 | Belart | 303/114 |
| 4,362,339 | 12/1982 | Belart | 303/117 |
| 4,415,210 | 11/1983 | Belart et al. | 303/116 |

Primary Examiner—Douglas C. Butler
Attorney, Agent, or Firm—James B. Raden; William J. Michals

[57] ABSTRACT

A dual-circuit hydraulic brake system with slip control, in particular for automotive vehicles, in which there are provided several sensors sensing the rotational behavior of the wheels and several solenoid valves (39, 37, 40, 38 41, 42, 30, 31) which are controllable by slip monitoring electronics (32). The wheel brakes (33, 34, 35, 36) connected to the brake circuits may be pressurized by a tandem master cylinder (3), on the one hand, and by an auxiliary pressure source, on the other hand. The auxiliary pressure source consists of an electric-motor-driven pressure medium pump (20) and of an accumulator (21). Each working chamber of the tandem master cylinder (3) hydraulically communicates with a brake valve (16) which may generate a dynamic pressure which, upon the actuation of the brake, will be supplied to wheel brakes (33, 34, 35, 36) by a switching-over action of inlet valves (30, 31). The inlet valves (30, 31) are additionally controllable by a differential pressure alarm switch (44) connected at the working chambers of the tandem master cylinder (3). This prevents dynamic pressure medium from entering a defective brake circuit, the intact brake circuit remaining operative in the usual manner.

8 Claims, 1 Drawing Figure

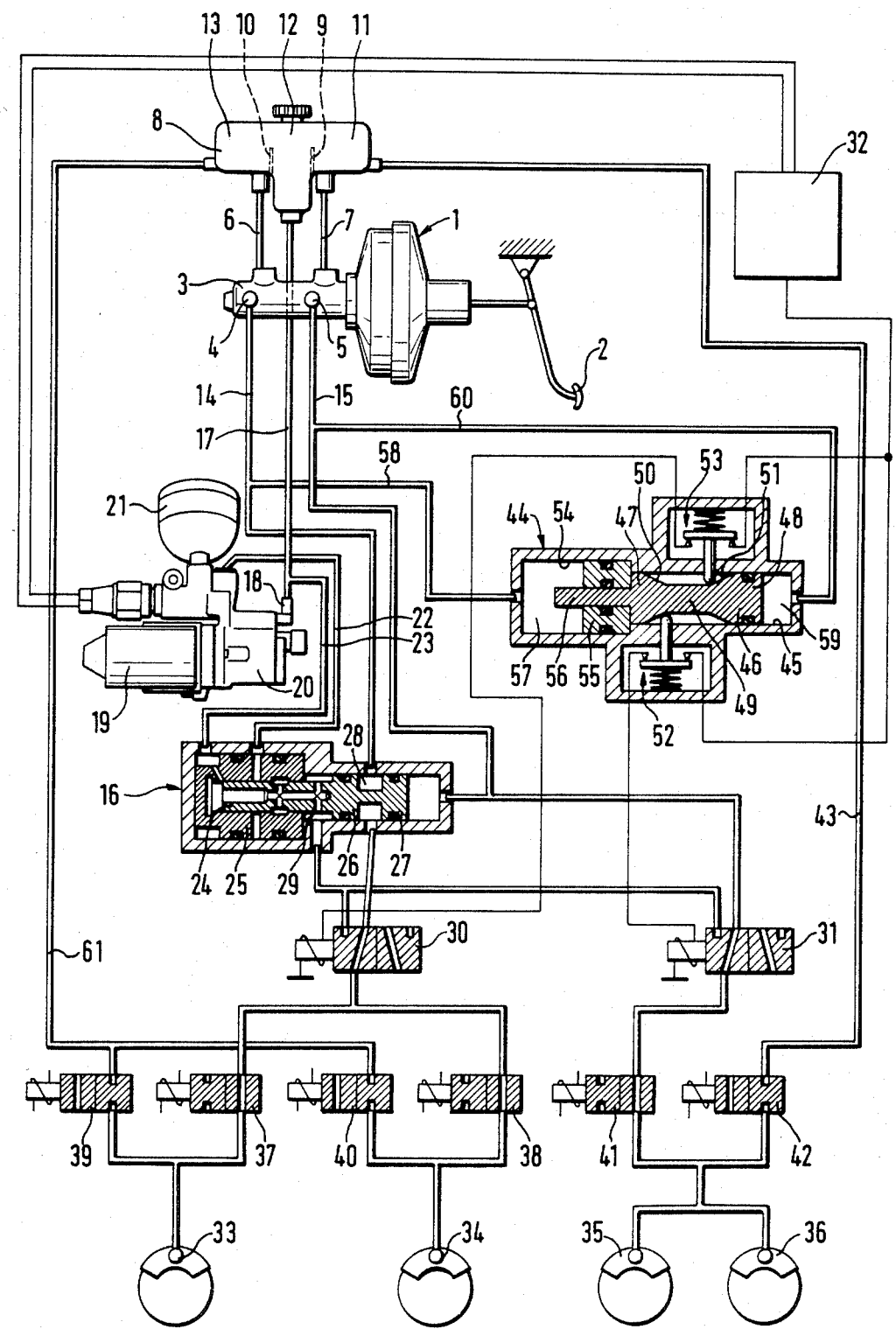

DUAL-CIRCUIT HYDRAULIC BRAKE SYSTEM

BACKGROUND OF THE INVENTION

This invention relates to a dual-circuit hydraulic brake system with slip control, in particular for automotive vehicles, with several sensors sensing the rotational behaviour of the wheels and with several solenoid valves controllable by slip monitoring electronics, in which brake system wheel brakes connected to the brake circuits may be pressurized by a tandem master cylinder, on the one hand, and by an auxiliary pressure source, on the other hand, said auxiliary pressure source consisting of an electric-motor-driven pressure medium pump and of an accumulator.

A hydraulic brake system with the above characteristics is known from the publication 'Bosch-Technische Berichte', Band 7, Heft 2, Seite 87, Bild 39 ('Bosch Technical Reports', vol. 7, no. 2, page 87, FIG. 39). The known brake system comprises a tandem master cylinder with a first working chamber of the tandem master cylinder having a joint communication to the wheel brake cylinders of the rear axle of an automotive vehicle via a solenoid valve which may be switched into three positions. Via an electromagnetically operable valve, a second working chamber of the tandem master cylinder, on the one hand, communicates with a first wheel brake cylinder of the front axle of the automotive vehicle. On the other hand, it communicates with the second wheel brake cylinder of the front axle of the automotive vehicle via a further electromagnetically operable three-position valve. In the rest position of the solenoid valves, the working chambers of the master cylinder and the wheel brake cylinders are communicating freely, thus the hydraulic pressure in the wheel brake cylinders essentially corresponding to the pressures in the working chambers of the tandem master cylinder.

Slip monitoring electronics detecting the presence of a critical slip value at a vehicle wheel, the solenoid valve associated with the respective vehicle wheel will be brought into a mid-position in which communication will be interrupted between the working chamber of the tandem master cylinder and the respective wheel brake cylinder. Now, the hydraulic pressure in the wheel brake cylinder of the wheel brake that caused the critical slip value will be kept constant. Should this action of keeping the pressure constant not suffice to effect a certain reacceleration value at the respective wheel, then, the respective solenoid valve would switch into a third position in which pressure medium will be tapped from the wheel brake so as to have the braking pressure drop and to promote a reacceleration of the wheel more strongly.

The known brake system further has an electric-motor-driven pump unit disposing over two separate circuits and put into operation by an electric motor when a critical slip value will have been reached at one vehicle wheel at the least. A first circuit of the pump unit is connected to one of the working chambers of the tandem master cylinder while the other circuit of the pump unit supplies pressure medium to the other working chamber of the tandem master cylinder. Should thus a corresponding pressure reduction have averted an impending lock-up condition at one vehicle wheel, the solenoid valve associated with said vehicle wheel would switch into the rest position after having overridden the mid-position, the volume required for a new increase of the braking pressure being furnished.

The pump unit receives pressure medium from several accumulators which admittedly have a limited volume. Should there occur a rupture in one of the pressure lines of the brake system there would be a depletion of the pressure medium reserve of the accumulators within a relatively short time, thus also the pump unit failing after a correspondingly short time due to the lack of pressure fluid at the suction side.

It is thus an object of the present invention to design a dual-circuit hydraulic brake system with the above referred-to characteristics such as to prevent the pressure medium supply to a damaged brake circuit upon failure of said brake circuit while, on the other hand, ensuring the pressure medium supply to the undamaged brake circuit by the pump unit.

SUMMARY OF THE INVENTION

According to this invention this object is solved in that each working chamber of the tandem master cylinder is communicating with a brake valve, in that the brake valve may generate a dynamic pressure which, upon the actuation of the brake, will be supplied to the wheel brakes by a switching-over action of inlet valves, and in that the inlet valves are additionally controllable by a differential pressure alarm switch connected at the working chambers of the tandem master cylinder. As long as the brake circuits connected to the tandem master cylinder are intact and thus approximately have the same pressure the differential pressure alarm switch will remain in a position which allows direct control of the inlet valves by slip monitoring electronics. Upon actuation of the brake, a hydraulic pressure will be modulated by means of a brake valve, said pressure being proportional to the actuating force applied to the brake pedal. Upon actuation of the brake, further, the inlet valves will switch over and thus the dynamic pressure generated by the brake valve will reach the wheel brakes. If there occurs a rupture in either of the brake circuits connected to the tandem master cylinder the differential pressure alarm switch will be transposed into a position in which an alarm contact of the differential pressure alarm switch will be opened and in which there will be an interruption of the current supply to the inlet valve of the defect brake circuit. The position of the inlet valve associated with the intact brake circuit will remain uninfluenced by this switching action, thus control going on in the intact brake circuit without the pressure fluid volume supplied by the brake valve being depleted via the inlet valve of the defect brake circuit. Thus, each time, the differential pressure alarm switch will switch that inlet valve into the rest position which is associated with a working chamber of the tandem master cylinder with a lower hydraulic pressure. The permissible pressure difference in the working chambers of the master cylinder will be adjustable by suitably rating the differential pressure alarm switch.

An advantageous embodiment of the dual-circuit brake system will be achieved in that a hydraulic pressure of one of the working chambers of the tandem master cylinder may transpose a piston of the differential pressure alarm switch into an axial position in which the alarm contacts will not be operated. In this respect it will be expedient for a smaller effective surface of the piston of the differential pressure alarm switch to communicate with a further working chamber of the tandem master cylinder.

It will further be advantageous if the wheel brakes combined to a brake circuit communicate with one return line each via normally closed 2/2-way valves, each return line ending in a separate chamber of a storage reservoir. The storage reservoir disposes over a third chamber communicating with the suction side of the pressure medium pump. As a result of such a design there will be a sufficient pressure medium reserve at the suction side of the pressure medium pump even in case of a pressure medium loss in one of the brake circuits connected to the tandem master cylinder.

A constructionally simple embodiment of the storage reservoir will be achieved by arranging partition walls in the storage reservoir via which it will be possible to fill the third chamber when the maximum level of filling will have been exceeded in the first and/or second chamber(s).

An expedient embodiment of the subject matter of the application further provides to arrange two normally closed contacts at the differential pressure alarm switch, said contacts being arranged in connections between slip monitoring electronics and the electromagnetic operating means of the inlet valves. On principle, it will also be possible to use normally open contacts at the differential pressure alarm switch.

BRIEF DESCRIPTION OF THE DRAWING

One example of an embodiment of the invention will be explained in more detail in the following, reference being made to the drawing in which the single FIGURE illustrates a dual-circuit hydraulic brake system with slip control.

DETAILED DESCRIPTION

In the drawing, reference numeral 1 marks a vacuum brake booster operable by means of a brake pedal 2 and followed by a tandem master cylinder 3 having two housing ports 4, 5. An unpressurized storage reservoir 8 is connected to the tandem master cylinder 1 via pressure lines 6, 7, partition walls 9, 10 subdividing the reservoir into three chambers 11, 12, 13.

Connected to the housing ports 4, 5 of the tandem master cylinder 3 are pressure lines 14, 15 leading to a brake valve 16. A pressure line 17 leads from the middle chamber 12 of the unpressurized storage reservoir 8 to the suction side 18 of a pressure medium pump 20 which may be driven by an electric motor 19. The electric motor drive 19 of the pressure medium pump 20 is controllable by a non-represented pressure gauge device. Thus an accumulator 21 hydraulically communicating with the pressure medium pump will provide a certain auxiliary pressure during operation of the brake system.

The pressure of the accumulator 21 will be supplied to the brake valve 16 via a pressure line 22. The brake valve 16, on the other hand, communicates with the middle chamber 12 of the unpressurized storage reservoir via a pressure line 23. The design of the brake valve 16 is a conventional one and the brake valve 16 disposes over a valve spool 24 which is axially displaceable in a valve housing 25. The valve spool 24 is displaceable in dependence on the pressurization of two pistons 26, 27. An annular chamber 28 is formed between the pistons 26, 27. Said annular chamber 28 communicates with the housing port 4 of the tandem master cylinder 3 via the pressure line 14. Referring to the drawing, the right-hand front face of the piston 27 of the brake valve 16 communicates with the housing port 5 of the tandem master cylinder 3 via the pressure line 15. The effective surfaces of the pistons 26, 27 which confine the annular chamber 28 of the brake valve 16 are the same in size. Thus, the hydraulic pressure of the tandem master cylinder 3 supplied via the pressure line 15 to the brake valve 16 will be the only one to influence the position of the valve spool 24. Depending on the position of the valve spool 24, a hydraulic pressure will be modulated in a pressure chamber 29 of the brake valve 16, said hydraulic pressure being proportional to the respective actuating force applied to the brake pedal 2.

The pressure chamber 29 of the brake valve 16 hydraulically communicates with two 3/2-way valves 30, 31. In the released position of the brake, said valves 30, 31 lock the pressure medium flow provided from the pressure chamber 29. The 3/2-way valves 30, 31 are electromagnetically operable by slip monitoring electronics 32. In the released position of the brake, the valves 30, 31 will release hydraulic paths between the pressure lines 14, 15 and the wheel brakes 33, 34, 35, 36, the wheel brakes 33, 34 being associated with the 3/2-way valve 30 and preferably arranged at the front axle of an automotive vehicle. The electromagnetically operable 3/2-way valve 31 controls communication between the housing port 5 of the tandem master cylinder 3 and the wheel brakes 35, 36 preferably located at the rear axle of an automotive vehicle.

Two electromagnetically operable and normally open 2/2-way valves 37, 38 are arranged at the outlet of the electromagnetic 3/2-way valve 30 in the connection between valve 30 and the wheel brakes 33, 34. Further, electromagnetically operable 2/2-way valves 39, 40 are arranged at the wheel brakes 33, 34. Said valves 39, 40 are normally locked. Upon corresponding actuation by the slip monitoring electronics 32, said valves 39, 40 may be switched into a position in which the wheel brakes 33, 34 will communicate with chamber 13 of the unpressurized storage reservoir 8 via a return line 61. An electromagnetically operable and normally open 2/2-way valve 41 is arranged in the connection between the 3/2-way valve 31 and the wheel brakes 35, 36 at the rear axle of the automotive vehicle. Said valve 41 will interrupt said connection upon corresponding actuation by the slip monitoring electronics 32. Likewise, via an electromagnetically operable 2/2-way valve 42, there exists a normally closed connection from the wheel brakes 35, 36 to a return line 43 hydraulically communicating with chamber 11 of the unpressurized storage reservoir 8.

A further component of the described dual-circuit brake system is a differential pressure alarm switch 44 provided with a differential piston 46 which is axially displaceable in a bore 45 of the housing. The differential piston 46 essentially consists of two piston heads 47, 48 connected with each other by a connecting web 49. At the transitions between the piston heads 47, 48 and the connecting web 49 ramps 50, 51 are arranged by means of which electrical contacts 52, 53 are operable in case of a suitable displacement of the differential piston 46. The electrical contacts 52, 53 are designed as break contacts connected in series with the electromagnetical operating means of the 3/2-way valves 30, 31. The connection has been selected such as to allow the electromagnetically operable 3/2-way valve 30 to be controllable by the slip monitoring electronics 32 as well as by the electric contact 53 while the coil of the electromagnetically operable 3/2-way valve 31 is connected to the slip monitoring electronics 32 via the electric contact 52.

Referring to the representation, the left-hand end of the housing bore 45 of the differential pressure alarm switch has a section 54 having a larger diameter. In said section 54, a positioning piston 55 is guided axially displaceably, while radially sealed. The positioning piston 55 is penetrated in a sealed manner by a tappet 56 formed at the piston head 47 and confines a chamber 57 which, via a pressure line 58, communicates with the pressure line 14 or the housing port 4 of the tandem master cylinder 3, respectively. Referring to the representation, the right-hand front face of the piston head 48 further confines a chamber 59 which, via a pressure line 60, communicates with the pressure line 15 or the housing port 5 of the tandem master cylinder 3, respectively.

In the following, the mode of operation of the described dual-circuit brake system will be explained in more detail. At first, it be assumed that the brake pedal 2 has not been applied, thus all the parts being in the represented positions. Further, it be assumed that the electric-motor-driven pressure medium pump 20 has generated a sufficient operating pressure in the accumulator 21. Upon actuation of the brake, hydraulic pressures will be built up in the working chambers of the tandem master cylinder 3. Said pressures will propagate to the differential pressure alarm switch 44 via the pressure lines 14, 58; 15, 60. The pressurization of the chamber 47 of the differential pressure alarm switch 44 will cause the positioning piston 55 to be displaced into a right-hand end position (see drawing), in which it will abut at the piston head 47 of the piston 46 and prevent a leftwards-bound displacement of the piston 46. Via the pressure lines 15, 60, the chamber 59 will be pressurized by pressure from a second working chamber of the tandem master cylinder 3. As the effective surface of the positioning piston 55 is larger than the pressurized effective surface of the piston head the piston 46 will remain in the drawn position as long as the pressures supplied to the chambers 57, 59 are not differing essentially from each other. In this position of the differential piston 46, the electric contacts 52, 53 are in their closed condition.

The hydraulic pressures generated in the tandem master cylinder 3 further will reach the brake valve 16 via the pressure lines 14, 15. At the beginning of the braking operation the electromagnetically operable 3/2-way valves 30, 31 will still be unexcited, thus the wheel brakes 33, 34 at the front axle being pressurized from the annular chamber 28 of the brake valve 16 via the open 3/2-way valve 30, while the pressure generated in the second working chamber of the tandem master cylinder 3 will proceed to the wheel brakes 35, 36 via the pressure line 15 and the open 3/2-way valve 31.

The pressure prevailing in the pressure line 15 will act on the right-hand front face of the piston 27 of the brake valve 16 (see drawing). This will cause the valve spool 24 to be displaced within the valve housing 25 in the direction of actuation, thus a dynamic pressure resulting in the pressure chamber 29 of the brake valve 16 which will be proportional to the actuating force exerted on the brake pedal 2. After a certain time lag either due to the system or predetermined by the slip monitoring electronics 32, the electromagnetically operable 3/2-way valves 30, 31 will switch into the actuating position in which a hydraulic communication will be established between the pressure chamber 29 of the brake valve 16 and the wheel brakes 33, 34, 35, 36. Thus the wheel brakes will be pressurized by a dynamic pressure.

The slip monitoring electronics 32 detecting a critical slip value at one or at several of the vehicle wheels, a corresponding actuation of the electromagnetically operable 2/2-way valves 37, 38, 39, 40, 41, 42 will enable the braking pressure to be kept constant for a corresponding time or the pressure to be reduced by tapping pressure medium from the wheel brakes 33, 34, 35, 36. Pressure medium tapped from the wheel brakes 33, 34, 35, 36 will flow back to the unpressurized storage reservoir 8 via the return lines 61, 43. The fluid supplied to the unpressurized storage reservoir will not flow over into the chamber 12 before a maximum level of filling will have been exceeded in chambers 11, 13.

In the following it will be assumed that, e.g., due to rupture of a line, an unduly great pressure reduction will have occurred in the section of the brake system connected to the housing port 4 of the tandem master cylinder 3 while an unchanged high hydraulic pressure will be available at the housing port 5. Consequently, there will also be a drop in the hydraulic pressure of chamber 57 of the differential pressure alarm switch 44. Thus the piston 46 will be moved to the left (see drawing) due to the pressurization of the piston head 48, the positioning piston 55 remaining in mechanical contact at the piston head 47. Such a displacement of the piston 46 will cause the electric contact 53 to adopt the open position, thus communication being interrupted between the slip monitoring electronics 32 and the magnet coil of the electromagnetically operable 3/2-way valve 30. The 3/2-way valve 30 therefore will switch back into the rest position in which communication will be interrupted between the pressure chamber 29 of the brake valve 16 and the wheel brakes 33, 34. In this way, it will be ensured that no dynamic pressure medium will enter the defect section of the brake system, thus preventing the pressure fluid volume from being depleted. The pressurization of the wheel brakes 35, 36 will remain unaffected by this switching operation, the wheel brakes 35, 36 arranged at the rear axle continuing to be dynamically pressurized.

If the hydraulic pressure at the housing port 5 of the tandem master cylinder 3 or in the chamber 59 of the differential pressure alarm switch 44, respectively, drops unduly while the hydraulic pressure at the housing port 4 is essentially kept up, the piston 46 of the differential pressure alarm switch 44 will move to the right (in the drawing) due to the pressurization of the effective surface of the tappet 56. In this action, solely the electric contact 52 will be opened, thus the electric connection being interrupted between the slip monitoring electronics 32 and the magnet coil of the 3/2-way valve 31. This will prevent dynamically pressurized pressure medium from being supplied from pressure chamber 29 of the brake valve 16 into the defect brake circuit.

What is claimed is:

1. A dual-circuit hydraulic brake system with slip control for automotive vehicles of the type having a plurality of sensors sensing the rotational behavior of the wheels and with a plurality of solenoid valves controllable by slip monitoring electronic devices, in which wheel brakes of the brake system connected to the brake circuits may be pressurized by a tandem master cylinder and by an auxiliary pressure source, with said auxiliary pressure source comprising an electric-motor-driven pressure medium pump and an accumulator, wherein each working chamber of the tandem master cylinder (3) communicates with a brake valve (16), wherein the brake valve (16) can generate a dynamic pressure which, upon the actuation of the brake, is supplied to the wheel brakes (33, 34, 35, 36) by a switching-over action of inlet valves (30, 31), and wherein the inlet valves (30, 31) are additionally controllable by a differential pressure alarm switch (44) having inputs respectively connected to the working chambers of the tandem master cylinder (3).

2. A dual-circuit hydraulic brake system as claimed in claim 1, wherein said differential pressure alarm switch (44) switches into its rest position that inlet valve (30, 31) which is associated with a working chamber of the tandem master cylinder (3) with the lowest hydraulic pressure.

3. A dual-circuit hydraulic brake system as claimed in claim 2 wherein a hydraulic pressure of one of the working chambers of the tandem master cylinder (3) can transpose a piston (46) of the differential pressure alarm switch (44) including alarm contacts into an axial position in which the alarm contacts (52, 53) will not be operated.

4. A dual-circuit hydraulic brake system as claimed in claim 3, wherein a smaller effective surface of the piston (46) of the differential pressure alarm switch (44) communicates with a further working chamber of the tandem master cylinder (3).

5. A dual-circuit hydraulic brake system as claimed in claim 4, wherein the wheel brakes (33, 34; 35, 36) combined in separate brake circuit communicate with one return line (61, 43) respectively by way of normally closed 2/2-way valves (39, 40; 41, 42), each of the return lines (61, 43) terminating in a separate chamber (13, 11) of a storage reservoir (8).

6. A dual-circuit hydraulic brake system as claimed in claim 5, wherein the storage reservoir (8) is disposed over a third chamber (12) communicating with the suction side (18) of the pressure medium pump (20).

7. A dual-circuit hydraulic brake system as claimed in claim 6, wherein partition walls (9, 10) are arranged in the storage reservoir (8) on opposite sides of the third chamber (12) and over which the third chamber (12) is filled when the maximum level of filling is exceeded in at least one of the first and second chamber(s) (11, 13).

8. A dual-circuit hydraulic brake system as claimed in claim 1, wherein two normally closed contacts (52, 53) are provided at the differential pressure alarm switch (44) which are arranged between one of said slip monitoring electronic devices (32) and the electromagnetic operating means of the inlet valves (30, 31).

* * * * *